(12) United States Patent
Moreau et al.

(10) Patent No.: US 9,927,182 B2
(45) Date of Patent: Mar. 27, 2018

(54) HEAT EXCHANGER TUBE, HEAT EXCHANGER TUBE BUNDLE, HEAT EXCHANGER COMPRISING SUCH A BUNDLE AND METHOD FOR PRODUCING A PLATE OF A HEAT EXCHANGER TUBE

(71) Applicant: Valeo Systemes Thermiques, Le Mesnil Saint Denis (FR)

(72) Inventors: Sylvain Moreau, Spay (FR); Francois Busson, Saint Gervais en Belin (FR); Mohamed Ibrahimi, Allonnes (FR); Maryse Philippe, La Suze sur Sarthe (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 566 days.

(21) Appl. No.: 14/402,431

(22) PCT Filed: May 16, 2013

(86) PCT No.: PCT/EP2013/060209
§ 371 (c)(1),
(2) Date: Nov. 20, 2014

(87) PCT Pub. No.: WO2013/174730
PCT Pub. Date: Nov. 28, 2013

(65) Prior Publication Data
US 2015/0090430 A1    Apr. 2, 2015

(30) Foreign Application Priority Data

May 22, 2012 (FR) ...................................... 12 54670

(51) Int. Cl.
*F28D 1/04*    (2006.01)
*B23P 15/26*   (2006.01)
(Continued)

(52) U.S. Cl.
CPC ................ *F28D 1/04* (2013.01); *B23P 15/26* (2013.01); *F28D 1/0391* (2013.01); *F28F 13/06* (2013.01);
(Continued)

(58) Field of Classification Search
CPC .......... F28D 1/04; F28D 1/0391; F28F 13/06; F28F 2265/00; F28F 9/026; Y10T 29/49373
(Continued)

(56) References Cited

U.S. PATENT DOCUMENTS

2003/0141046 A1  7/2003  Ikeda et al.
2004/0134645 A1  7/2004  Higashiyama
(Continued)

FOREIGN PATENT DOCUMENTS

EP   2 192 282 A1   2/1974
EP   1 455 154 A2   9/2004
(Continued)

OTHER PUBLICATIONS

International Search Report for Application No. PCT/EP2013/060209 dated Aug. 21, 2013, 7 pages.
(Continued)

*Primary Examiner* — Jianying Atkisson
*Assistant Examiner* — Joel Attey
(74) *Attorney, Agent, or Firm* — Howard & Howard Attorneys PLLC

(57) ABSTRACT

A tube (2) of a heat exchanger (1) is intended to allow an exchange of heat between a first fluid and a second fluid flowing in contact with the tube (2). The tube (2) comprises an upper plate (22) and a lower plate (21) positioned facing one another and defining an internal space (25) in the tube (2) in which the first fluid is able to circulate. Each of the plates (21, 22) comprises a bottom (23) and at least one edge (24). The plates (21, 22) are in contact with one another at
(Continued)

the edge (24). The tube (2) comprises a deflection screen (30) secured to the edge (24), with the deflection screen (30) comprising a first wall (31) extending transversely to the bottoms (23) and arranged to deflect the second fluid toward the bottoms (23). The invention also relates to a bundle of such tubes and to a heat exchanger comprising such a bundle, and to a method for producing a heat exchanger tube plate.

14 Claims, 3 Drawing Sheets

(51) Int. Cl.
| | | |
|---|---|---|
| *F28F 13/06* | (2006.01) | |
| *F28F 19/00* | (2006.01) | |
| *F28D 1/03* | (2006.01) | |
| *F28F 9/02* | (2006.01) | |

(52) U.S. Cl.
CPC .............. *F28F 19/00* (2013.01); *F28F 9/026* (2013.01); *F28F 2265/00* (2013.01); *Y10T 29/4935* (2015.01); *Y10T 29/49373* (2015.01)

(58) Field of Classification Search
USPC ......................................................... 165/148
See application file for complete search history.

(56) References Cited

U.S. PATENT DOCUMENTS

| | | | | |
|---|---|---|---|---|
| 2004/0206481 | A1* | 10/2004 | Inaba | .................... F28D 1/0391 165/134.1 |
| 2009/0242182 | A1 | 10/2009 | Moreau | |

FOREIGN PATENT DOCUMENTS

| | | |
|---|---|---|
| EP | 2 105 694 A1 | 9/2009 |
| EP | 2 293 003 A2 | 3/2011 |
| GB | 1 424 689 | 2/1976 |
| JP | S 60-173871 A | 9/1985 |

OTHER PUBLICATIONS

English language abstract for EP 2 105 694 extracted from espacenet.com database on Dec. 4, 2014, 2 pages.
English language abstract not found for FR 2 192 282; however, see English language equivalent GB 1,424,689. Original document extracted from espacenet.com database on Dec. 4, 2014, 91 pages.
English language abstract for JPS 60-173871 extracted from PAJ database on Dec. 4, 2014, 1 page.

* cited by examiner

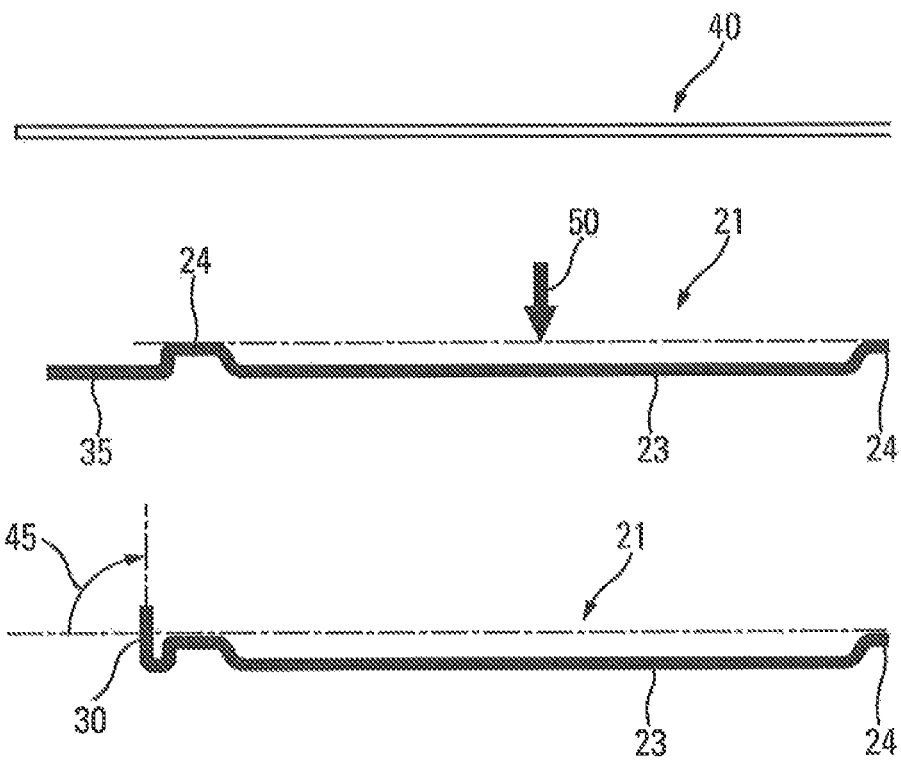
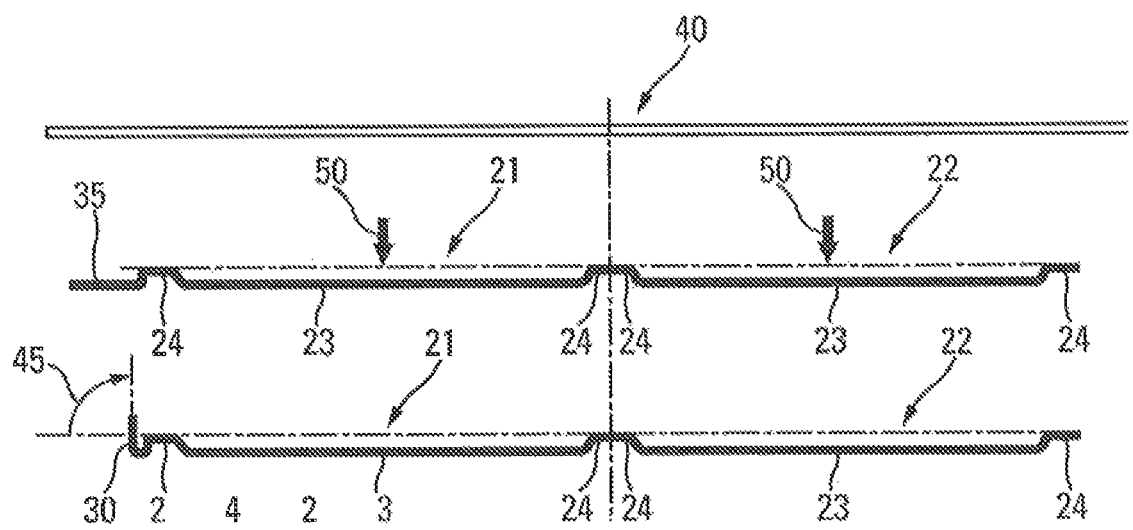

HEAT EXCHANGER TUBE, HEAT EXCHANGER TUBE BUNDLE, HEAT EXCHANGER COMPRISING SUCH A BUNDLE AND METHOD FOR PRODUCING A PLATE OF A HEAT EXCHANGER TUBE

RELATED APPLICATIONS

This application is the National Stage of International Patent Application No. PCT/EP2013/060209, filed on May 16, 2013, which claims priority to and all the advantages of French Patent Application No. FR 12/54670, filed on May 22, 2012, the content of which is incorporated herein by reference.

The invention is in the field of heat exchangers, for example motor vehicle heat exchangers, notably those situated in a motor vehicle heating, ventilation and/or air conditioning installation. The heat exchangers concerned correspond, in a preferred application, to the evaporators provided on the vehicle air conditioning circuits or loops. However, other applications of these heat exchangers are also conceivable without departing from the scope of the invention.

Evaporators comprising a core bundle of tubes are known. A first fluid circulates inside each tube from an inlet to an outlet of the core bundle and exchanges heat with a second fluid, for example a flow of air which sweeps over the tubes as it crosses the core bundle from an inlet face of the core bundle to an outlet face of the core bundle.

The tubes comprise a lower plate and an upper plate each one provided with a bottom and with a rim. They are joined together at their rims to form an internal volume of the tube which is intended to receive the first fluid. In such a heat exchanger, the second fluid comes into contact with the tubes by impinging on an edge face formed by the joining-together of the two rims.

The flow of air crossing the core bundle may contain impurities which encourage accelerated corrosion. By way of example, such impurities may be particles of copper from the motor of the motor-fan unit used for the forced cooling of the heat exchanger. Now, the rim of the plates against which rim the flow of air comes into contact with the tubes is a zone that is sensitive, notably to corrosion, particularly because of its inclination with respect to the direction of the flow of air sweeping over the core bundle. This results in rapid deterioration of this zone of the tubes which may lead to cracks and leaks via which the first fluid circulating inside the tubes can escape.

The invention seeks to improve the situation.

In order to do so, it proposes a tube of a heat exchanger intended to allow an exchange of heat between a first fluid and a second fluid circulating in contact with the tube, said tube comprising an upper plate and a lower plate positioned opposite and defining an internal volume of the tube in which the first fluid is able to circulate, each of the plates comprising a bottom and at least a rim, said plates being in contact with one another at said rim, characterized in that said tube comprises a deflector secured to the rim, the deflector comprising a first wall extending transversely to the bottoms and designed to deflect the second fluid toward said bottoms.

Thus the invention makes it possible, notably by virtue of the deflector, to direct the flow of the second fluid toward the bottoms of the plates, i.e. to direct the flow of the second fluid in such a way that it does not impinge on the rims head-on. The flow rate of the second fluid coming into contact with the corrosion-sensitive zone situated at the rims is therefore greatly reduced. The second fluid can thus flow along the bottoms of the plates, in a direction substantially parallel to the extension of these plates.

The first wall extends, for example, at right angles to the bottoms of said plates.

According to one aspect of the invention, said rim and said bottom extend in distinct planes. The rim is notably raised relative to the bottom.

In one particular embodiment of the invention, the bottom of each plate comprises a face facing toward the outside of the tube, referred to as external face, a height of the tube being defined between the external faces of the lower and upper plates along an axis, referred to as first axis, perpendicular to the bottoms, the first wall extending along the first axis over a distance comprised between the height of the tube and the height of the tube reduced by 0.4 mm. The first wall is thus not as tall as the tube and does not protrude beyond either the external face of the lower plate or the external face of the upper plate along the first axis. This lower height of the deflector by comparison with the rest of the tube makes it possible to avoid the generation of mechanical interference between the deflector and the interlayers positioned between two adjacent tubes when a core bundle of tubes is being preassembled.

Advantageously, the first wall comprises a first end situated a distance strictly less than 0.2 mm away from the external face of the lower plate along the first axis. Advantageously, the first wall comprises a second end situated a distance strictly less than 0.2 mm away from the external face of the upper plate along the first axis. The deflector thus protects the rim of the tube from the second fluid over a height that is great enough that the velocity of the second fluid avoids the rim of the tube.

Advantageously, the deflector is centered with respect to the tube along the height of said tube. The second fluid is therefore directed similarly toward the bottom of the upper plate and toward the bottom of the lower plate.

In one embodiment of the invention, the deflector comprises a second wall connected to, and extending transversely with respect to, the first wall, and a third wall, connected to, and extending transversely with respect to, the second wall on the one hand, and the rim on the other.

According to one embodiment of the invention, the deflector is placed on the lower plate.

According to one aspect of the invention, the deflector is positioned along a longitudinal side of the tube intended to receive the second fluid. It will be understood here that the deflector is positioned on that side of the tube that is able to be first in contact with the second fluid, namely on that side of the tube that is intended to be first to receive the second fluid. In other words, the second fluid is intended to come into contact with the tube in the region of the deflector.

Advantageously, the deflector is formed as one with the lower plate or the upper plate. The deflector may be formed as one with the lower plate and the upper plate.

Alternatively, the deflector is attached to said tube.

The invention also relates to a heat exchanger core bundle comprising at least one such tube as described hereinabove. The core bundle notably comprises a plurality of tubes as described hereinabove.

The invention also relates to a heat exchanger comprising a core bundle as described hereinabove.

According to one aspect of the invention, the core bundle comprises an inlet face for admitting the second fluid into the core bundle, the deflector of the tube being positioned on said inlet face side of the core bundle, notably in the plane in which the inlet face lies. It is, for example, all or some of the tubes of the plurality of tubes of the core bundle that comprise a deflector. These deflectors are notably positioned on said inlet face side of the core bundle.

The invention further relates to a method of manufacturing a lower plate of a tube of a heat exchanger, in which method:
a flat metal strip is pressed to generate the lower plate comprising a rim surrounding a bottom and a distal end adjacent to the rim, and
the distal end is bent to form a deflector extending transversely with respect to the bottom.

The attached figures will make it easy to understand how the invention may be embodied. In these figures, identical references denote elements that are similar.

FIG. 4 depicts a method for pressing a plate of a tube according to the invention.

FIG. 5 depicts a method for pressing an alternative form of plate of a tube according to the invention.

Figure 1:
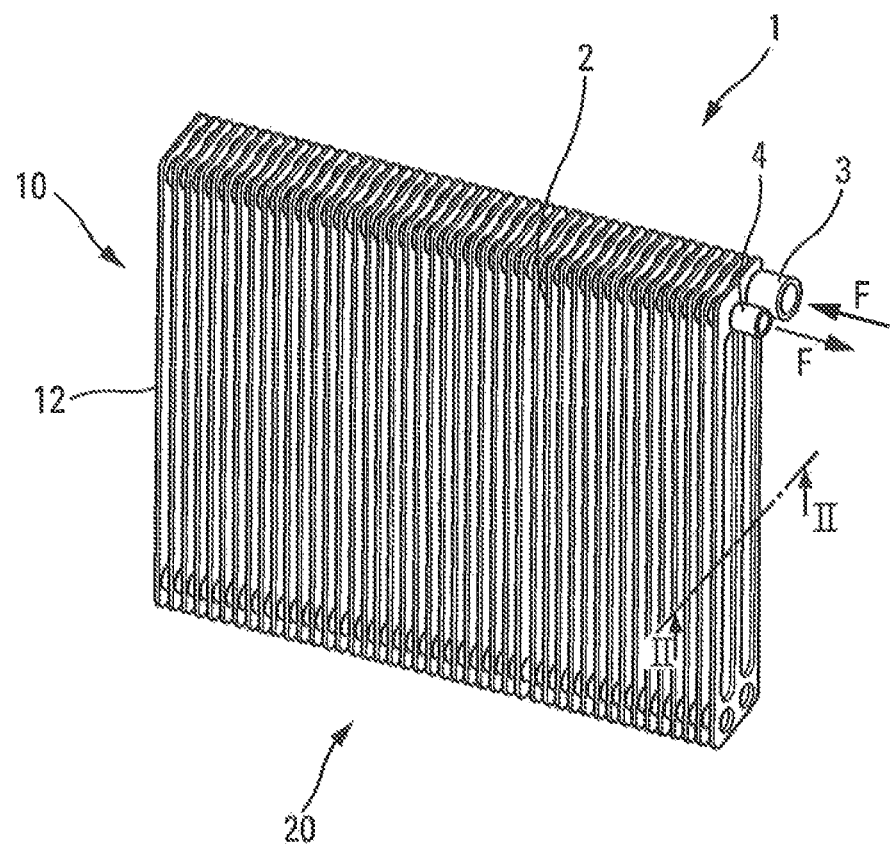
FIG. 1 is a perspective view of one embodiment of a heat exchanger comprising a core bundle of tubes according to the invention.

The invention finds an application for example in a heat exchanger as depicted in FIG. 1. This heat exchanger is notably intended to be situated in a motor vehicle heating, ventilation and/or air-conditioning installation. Such a heat exchanger 1 is, for example, an evaporator of a motor vehicle cabin air conditioning loop.

The heat exchanger 1 may comprise a core bundle 10 of parallel tubes 2. Such a heat exchanger 1 comprises nozzles, these respectively being an inlet nozzle 3 and an outlet nozzle 4, in the direction of circulation F of a first fluid, notably a refrigerant, circulating through the tubes 2. The first fluid therefore circulates through the tubes 2 of the heat exchanger 1, making a circulation loop from the inlet nozzle 3 to the outlet nozzle 4. A second fluid sweeps over the core bundle 10 from an inlet face 11 of the core bundle 10 to an outlet face (not visible) of the core bundle 10. This second fluid is notably external air intended to be sent into the vehicle interior in order to air-condition the latter. It sweeps over the core bundle, passing between the tubes 2 in a direction substantially perpendicular to the direction in which the first fluid circulates.

The tubes 2 are thus intended to allow an exchange of heat between the first and the second fluids circulating in contact with the tube 2.

Figure 2:
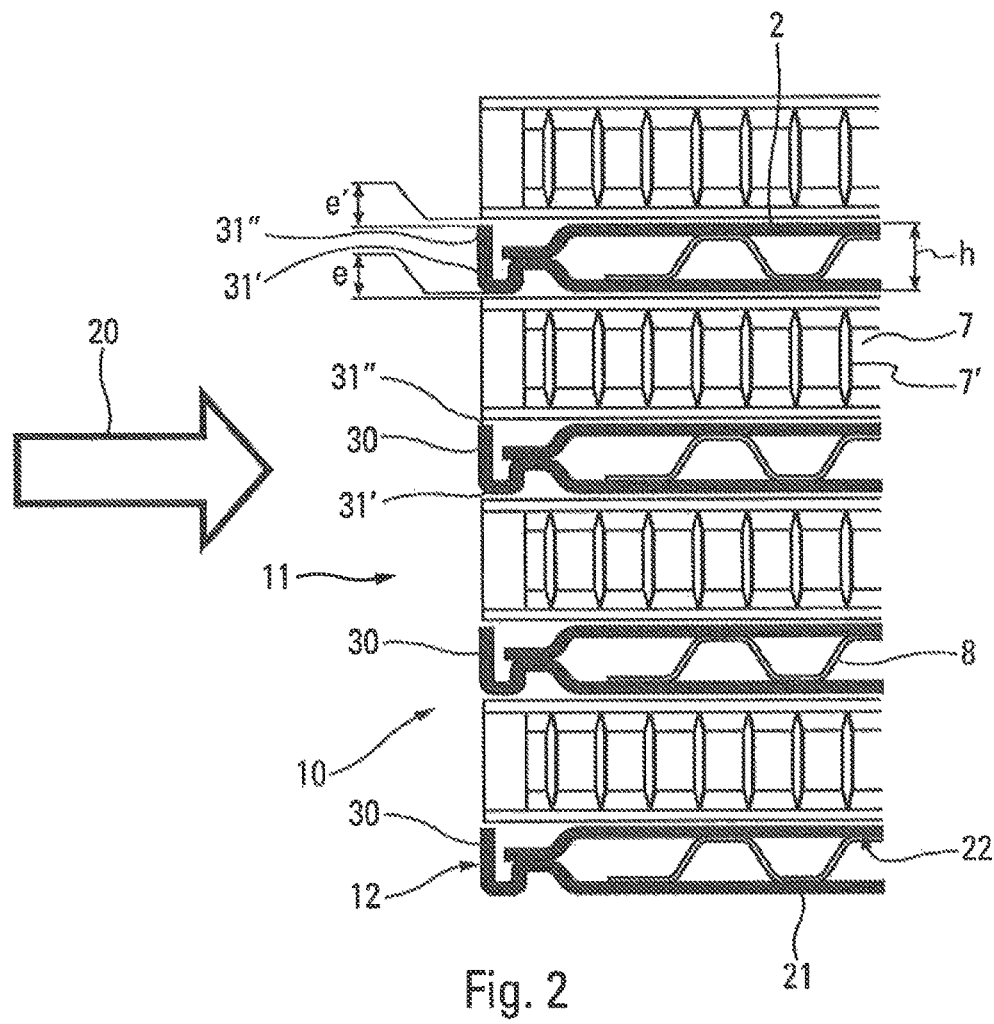
FIG. 2 is a cross section through the core bundle of tubes on II-II of FIG. 1.
Figure 3:
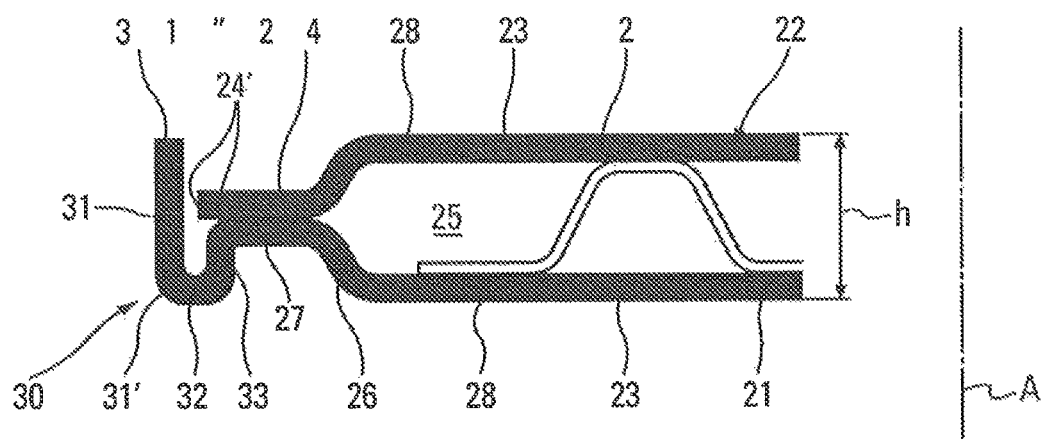
FIG. 3 is a view similar to FIG. 2, depicting in greater detail a tube according to the invention from the core bundle.

Part of the core bundle 10 of tubes 2 is depicted in FIG. 2 and one of the tubes 2 of the core bundle 10 according to the invention is depicted in greater detail in FIG. 3. The description given hereinbelow relates to these two figures.

These figures depict just one side of the core bundle, namely in this instance the inlet face 11 of the core bundle 10. The arrow referenced 20 illustrates the direction of the flow of the second fluid.

The core bundle 10 thus comprises a stack of tubes 2, here installed in parallel. Each tube 2 comprises a lower plate 21 and an upper plate 22 which are situated opposite one another so as to define an internal volume 25 in which the first fluid circulates. The tubes 2 have a flattened cross section and between them are positioned interlayers 7 that increase the surface area for exchange of heat between the first fluid and the second fluid. The interlayers 7 are, for example, provided with slats 7' in order to deflect the flow of the second fluid with a view to increasing the exchange of heat with the first fluid. The inside of the tubes 2 may also include perturbators 8 which, like the interlayers 7, increase the surface area for exchange of heat and the mechanical integrity of the tubes 2. Each tube 2 defines, for example, a plurality of parallel internal canals through which the first fluid can circulate.

The various elements mentioned hereinabove that the heat exchanger 1 comprises are notably brazed together.

Each one of the plates 21, 22 comprises a bottom 23 which is substantially flat and surrounded by a rim 24. It is at their rims 24 that the plates 21, 22 are joined together, notably by brazing. The rim 24 comprises a first part 26, for example inclined at 45° in the clockwise direction with respect to the bottom 23 and connected thereto, and a second part 27 inclined at 45° in the counterclockwise direction with respect to the first part 26, namely the second part runs substantially parallel to the bottom 23. It is at their second part 27 that the plates are assembled together, notably by brazing. The rims 24 terminate in an end 24'.

According to the invention, the tube comprises a deflector 30 secured to the rim 24, the deflector 30 comprising a first wall 31 extending transversely to the bottoms 23 and designed to deflect the second fluid toward the bottoms 23.

The deflector 30 may be attached to the tube 2 or, as illustrated in FIGS. 2 and 3, formed as one with the tube 2, notably in the continuation of the rim 24.

The first wall 31 of the deflector 30 in this instance extends perpendicular to the bottoms 23. It comprises a first end 31' situated on the same side as the lower plate 21 and a second end 31" situated on the same side as the upper plate 22.

The deflector 30 comprises a second wall 32 connected to the first wall 31 at the first end 31'. The second wall 32 extends transversely to the first wall 31, and notably at right angles to the first wall 31, namely in this instance parallel to the bottoms 23. The deflector 30 comprises a third wall 33 connected to the second wall 32. The third wall 33 extends transversely to the second wall 32 and notably at right angles to the second wall 32. The third wall 33 is connected, on the one hand, to the second wall 32 and, on the other hand, to the rim 24, and notably to the end 24' of the rim 24.

In the example illustrated, the deflector 30 is derived from the lower plate 21. In particular, it is the third wall 33 that is derived from the rim 24 of the lower plate. The first wall 31 here is separated from the rim 24 of the upper plate 22. The deflector 30 could also be positioned only on the upper plate 22 or on the upper and lower plates 21, 22.

The bottom 23 of each plate 21, 22 comprises a face 28 facing toward the outside of the tube 2, referred to as the external face 28, which is in contact with the second fluid. The height h of the tube 2 is defined as being the distance between the external faces 28 of the lower 21 and upper 22 plates along an axis, referred to as first axis A, perpendicular to the bottoms 23. The first wall 31 extends along the first axis A over a distance comprised between the height h of the tube and the height h of the tube minus 0.4 mm. It will be appreciated here that the first wall 31 does not extend beyond the external faces 28 of the bottoms 23 of the lower 21 and upper 22 plates along the first axis A.

The first wall 31 here is centered with respect to the tube 2. In other words, the first wall 31 is centered with respect to a median plane of the tube 2 passing through the brazed joint between the rim 24 of each plate, the lower plate 21 extending on a first side of the median plane and the upper plate 22 extending on a second side of the median plane.

Thus, the first end 31' of the first wall 31 is situated a distance strictly less than 0.2 mm away from the external face 28 of the lower plate along the first axis A. For preference, the distance between the first end 31' and the external face 28 of the lower plate along the first axis A is 0.1 mm. Likewise, the first wall of the second end 31" is situated a distance strictly less than 0.2 mm away from the external face 28 of the upper plate 22 along the first axis A. For preference, the distance between the second end 31" and the external face 28 of the upper plate along the first axis A is 0.1 mm.

There is therefore a clearance e between the first end 31' and the external face 28 of the lower plate along the first axis and/or a clearance e' between the second end 31" and the external face 28 of the upper plate 22. This or these clearance or clearances e, e' notably make it possible, when assembling the heat exchanger, to avoid mechanical interferences between the interlayers and the deflector 30.

The deflector 30 of the tubes is positioned on the inlet face 11 side of the core bundle 10. It is thus positioned on a longitudinal side 12 of the tubes which are intended to receive the second fluid as it enters the core bundle 10. It can thus deflect the flow of the second fluid as the latter enters the core bundle 10. As explained previously, just one side of the core bundle 10 has been depicted in FIG. 2, the other side, which corresponds to the outlet face of the core bundle being symmetric with respect to the side depicted, with the exception that it does not comprise the deflector 30.

FIGS. 4 and 5 depict a method of manufacturing a lower plate of a tube according to the invention which plate is intended to be installed in a heat exchanger core bundle of a heat exchanger according to the invention.

According to this method:
the starting point is a flat metal strip 40
this flat metal strip 40 is pressed in the direction of the arrow referenced 50 in order to generate the lower plate 21 comprising a rim 24 surrounding a bottom 23 and a distal end 35 adjacent to the rim 24. The distal end may be present on just one side of the lower plate 21. The bottom 23 and the distal end 35 therefore extend substantially in the same plane whereas the rim 24 is raised in relation to the bottom 23 and to the distal end 35.
the distal end 35 is bent up following the direction of the arrow referenced 45 so as to form the deflector 30 extending transversely to the bottom 23.

In this way is manufactured a lower plate 21 intended to be assembled with an upper plate 22 comprising a similar bottom 23 and rim 24, so that between them they form the tube 2 provided with the deflector 30 as defined hereinabove.

FIG. 5 depicts a method according to one aspect of the invention in which the lower plate 21 comprising the distal end 35 and the upper plate 22 not comprising any distal end 35, i.e. the upper plate 22 comprising no deflector 30, are pressed simultaneously. These lower and upper plates 21, 22 can then be positioned side by side and form part of the same metal strip 40. Finally, a lower plate 21 and an upper plate 22 are simultaneously formed from one and the same metal strip 40.

The distal end 35 of the lower plate 21 is then bent up as explained previously in order to form the deflector 30. The metal strip 40 is then cut to divide the lower plate 21 comprising the deflector 30 from the upper plate 22 comprising no deflector 30. As an alternative, the upper plate is bent through 180° in order to bring the rim 24 of the upper plate 22 onto the rim 24 of the lower plate 21.

According to another aspect of the invention, the method may involve a step of assembling one of the plates 21, 22 on the other so as to position them opposite each other so that they form the tube 2 as described hereinabove.

The invention claimed is:

1. A tube (2) of a heat exchanger (1) intended to allow an exchange of heat between a first fluid and a second fluid circulating in contact with the tube (2), the tube (2) comprising an upper plate (22) and a lower plate (21) positioned opposite and defining an internal volume (25) of the tube (2) in which the first fluid is able to circulate, each of the plates (21, 22) comprising a bottom (23) and at least a rim (24), the plates (21, 22) being in contact with one another at the rim (24), wherein the tube (2) comprises a deflector (30) secured to the rim (24), the deflector (30) comprising a first wall (31) extending transversely to the bottoms (23) and designed to deflect the second fluid toward the bottoms (23) and wherein the deflector (30) comprises a second wall (32) connected to, and extending transversely with respect to, the first wall (31), and a third wall (33), connected to, and extending transversely with respect to, the second wall (32) on the one hand, and the rim (24) on the other and wherein the second wall (32) is spaced from the upper plate (22) and wherein the first wall (31) is longer than the third wall (33).

2. The tube (2) as claimed in claim 1, in which the rim (24) and the bottom (23) extend in distinct planes.

3. The tube (2) as claimed in claim 1, in which the bottom (23) of each plate (21, 22) comprises a face (28) facing toward an external face (28) of the tube (2), a height (h) of the tube (2) being defined between the external faces (28) of the lower (21) and upper (22) plates along a first axis (A), perpendicular to the bottoms (23), the first wall (31) extending along the first axis (A) over a distance comprised between the height (h) of the tube (2) and the height (h) of the tube (2) reduced by 0.4 mm.

4. The tube (2) as claimed in claim 3, in which the first wall (31) comprises a first end (31') situated a distance strictly less than 0.2 mm away from the external face (28) of the lower plate (21) along the first axis (A).

5. The tube (2) as claimed in claim 4, in which the first wall (31) comprises a second end (31") situated a distance strictly less than 0.2 mm away from the external face (28) of the upper plate (22) along the first axis (A).

6. The tube (2) as claimed in claim 3, in which the first wall (31) comprises a second end (31") situated a distance strictly less than 0.2 mm away from the external face (28) of the upper plate (22) along the first axis (A).

7. The tube (2) as claimed in claim 3, in which the first wall (31) is centered with respect to the tube (2) along the height (h) of the tube (2).

8. The tube (2) as claimed in claim 1, in which the deflector (30) is positioned along a longitudinal side (12) of the tube (2) able to be first in contact with the second fluid.

9. The tube (2) as claimed in claim 1, in which the deflector (30) is formed as one with the lower plate (21) or the upper plate (22).

10. The tube (2) as claimed in claim 2, in which the bottom (23) of each plate (21, 22) comprises a face (28) facing toward an external face (28) of the tube (2), a height (h) of the tube (2) being defined between the external faces (28) of the lower (21) and upper (22) plates along an axis, referred to as a first axis (A), perpendicular to the bottoms (23), the first wall (31) extending along the first axis (A) over a distance comprised between the height (h) of the tube (2) and the height (h) of the tube (2) reduced by 0.4 mm.

11. A core bundle (10) comprising at least one tube (2) as claimed in claim 1.

12. A heat exchanger (1) comprising a core bundle (10) as claimed in claim 11.

13. The exchanger (1) as claimed in claim 12, in which the core bundle (10) comprises an inlet face (11) for admitting the second fluid into the core bundle (10), the deflector (30) of the tube (2) being positioned on the inlet face (11) side of the core bundle (10).

14. A method of manufacturing a lower plate (21) of a tube (2) of a heat exchanger (1) intended to allow an exchange of heat between a first fluid and a second fluid circulating in contact with the tube (2), the method comprising:
   pressing a flat metal strip (40) to generate the lower plate (21) comprising a rim (24) surrounding a bottom (23) and a distal end (35) adjacent to the rim (24);
   and bending the distal end (35) to form a deflector (30) extending transversely with respect to the bottom (23),
   wherein the lower plate (21) and upper plate (22) positioned opposite define an internal (25) of the tube (2) in which the first fluid is able to circulate, and
   wherein the deflector (30) comprises a first wall (31) extending transversely to the bottom (23) and wherein the deflector (30) comprises a second wall (32) connected to, and extending transversely with respect to, the first wall (31), and a third wall (33), connected to, an extending transversely with respect to, the second wall (32) on the one hand, and the rim (24) on the other and wherein the second wall (32) is spaced from the upper plate (22) and wherein the first wall (31) is longer than the third wall (33).

\* \* \* \* \*